Dec. 9, 1924.
F. EVANS
1,518,399
HEADLIGHT FOR BICYCLES, MAGNETIC DRIVE
Filed June 26, 1920　　2 Sheets-Sheet 1
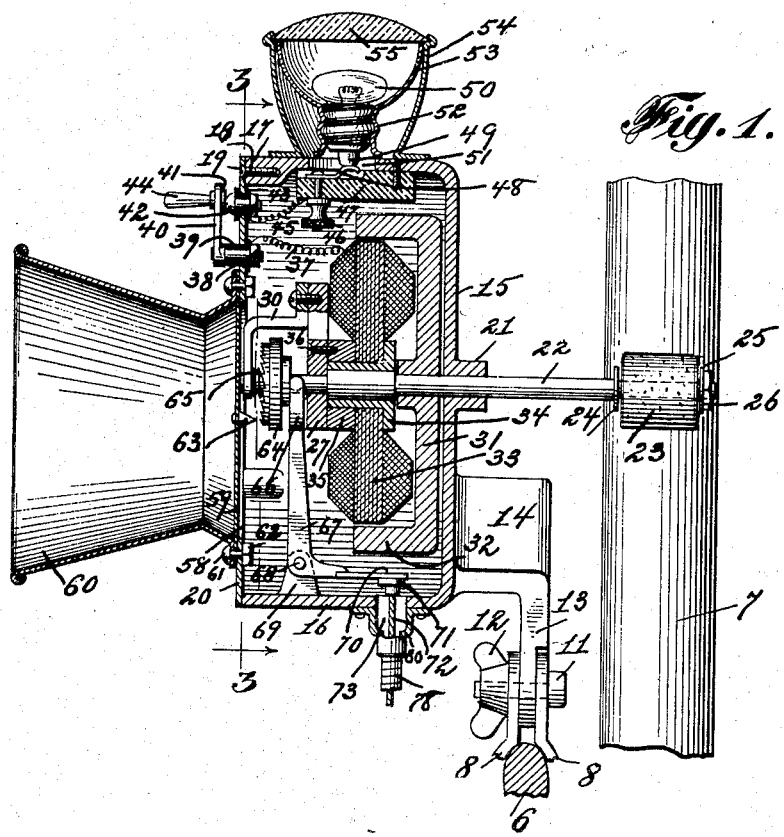
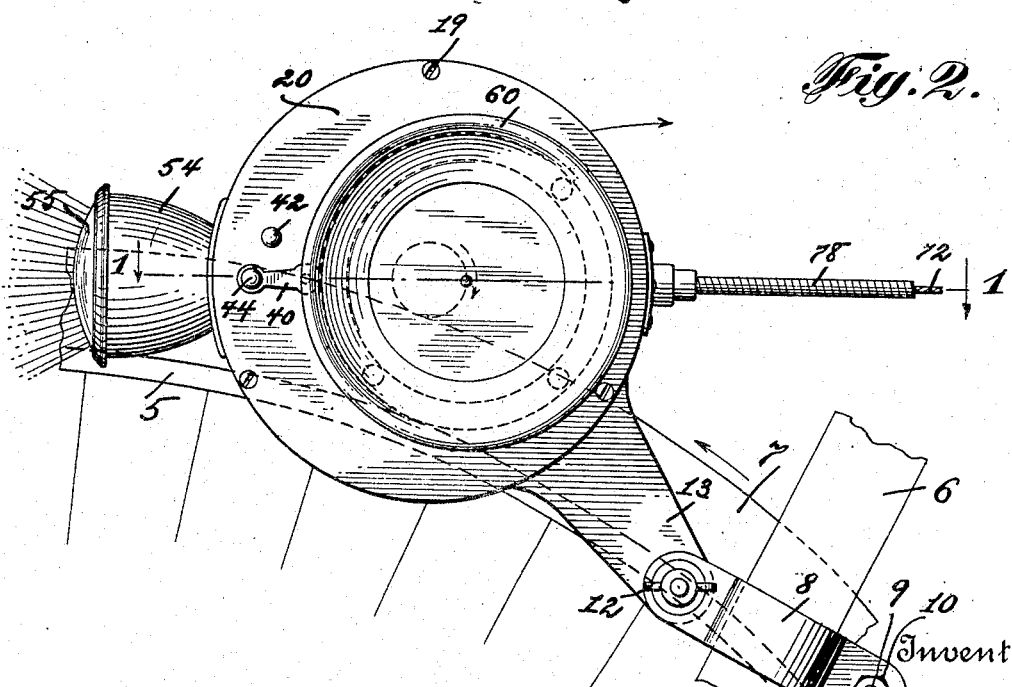
Inventor
Fred Evans
By his Attorney
Fred'k C. Fischer Dec. 9, 1924.

F. EVANS 1,518,399

HEADLIGHT FOR BICYCLES, MAGNETIC DRIVE

Filed June 26, 1920  2 Sheets-Sheet 2

Inventor
Fred Evans
By his Attorney
Fredk C. Fischer

Patented Dec. 9, 1924.

1,518,399

UNITED STATES PATENT OFFICE.

FRED EVANS, OF SUMMIT, NEW JERSEY, ASSIGNOR TO LOUIS V. ARONSON, OF NEWARK, NEW JERSEY.

HEADLIGHT FOR BICYCLES, MAGNETIC DRIVE.

Application filed June 26, 1920. Serial No. 392,023.

*To all whom it may concern:*

Be it known that I, FRED EVANS, a citizen of the United States, residing in the city of Summit, in the county of Union and State of New Jersey, have invented certain new and useful Improvements in Headlights for Bicycles, Magnetic Drive, of which the following is a full, clear, and exact description, such as will enable others skilled in the art to which it pertains to make, construct, and use the same, reference being had to the accompanying drawings, and to numerals of reference marked thereon, forming a part of this specification.

This invention relates to improvements in a combination head-light and horn, designed for use in connection with bicycles, motor-cycles and for other analogous uses and purposes for which it may be adapted.

The principal object of this invention is the provision of a combined head-light and horn of the character specified, wherein there is provided a magneto as the source of energy for causing the lamp to glow, the parts being so constructed and arranged that the shaft for actuating the magneto acquires its rotary motion from a ground wheel of the bicycle or motor-cycle and is employed as the instrumentality through which to effect the sounding of the horn when desired.

The invention is also concerned with the provision of a simple casing for housing the working parts, and to which the head-light and horn may be attached; and also with the provision of simple means by which to adjustably support the casing on a frame part of the bicycle or motor-cycle.

Other objects and advantages will appear in the following specification, and the invention will be particularly defined in the claims hereto appended.

In the accompanying drawings, forming a part of this specification, Figure 1 represents in plan a central horizontal sectional view of the structure, taken on line 1—1 of Fig. 2.

Figure 2 is a side elevational view of the structure, illustrated in connection with a fragmentary portion of a ground wheel and its steering fork.

In Figs. 1 and 2 of the accompanying drawings, I illustrate my improvements in connection with a fragment of a front ground wheel of a bicycle, and also in connection with a rigid frame part 6 representing a fragment of the usual steering fork for the same, the ground wheel being equipped with the usual pneumatic tire 7.

Figure 3:
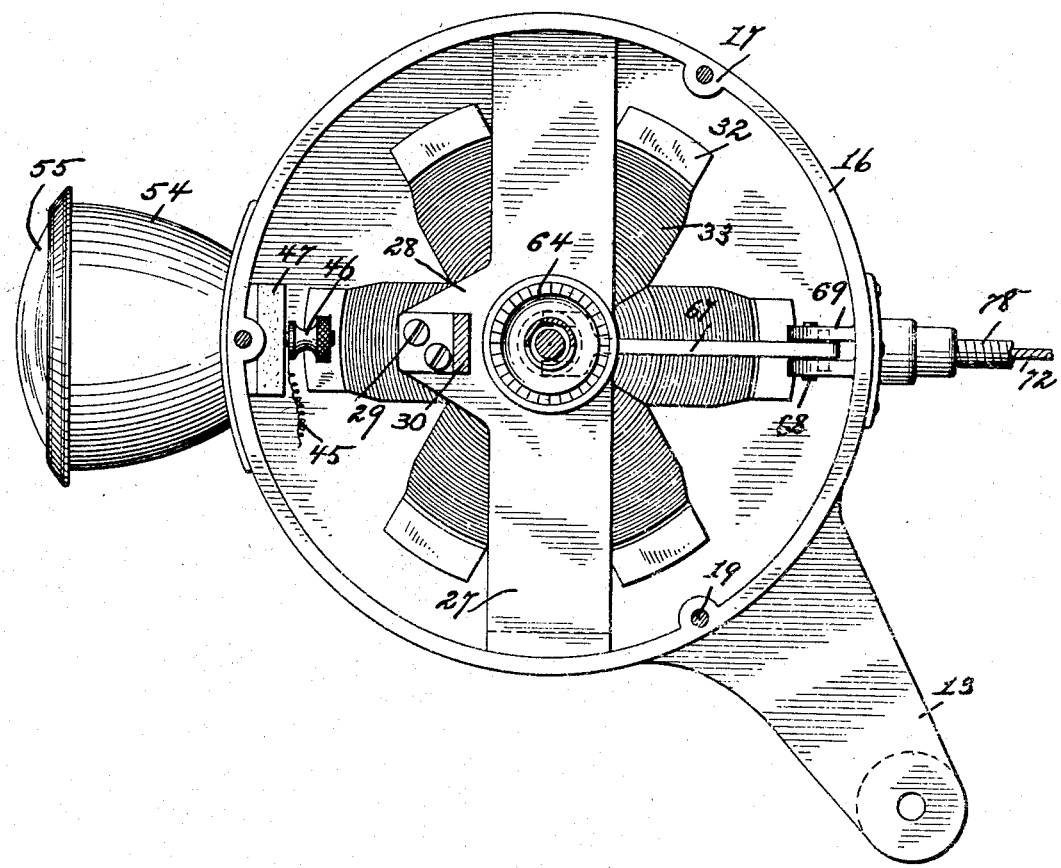
Fig. 3 is an elevational view and section taken on the line 3—3 of Figure 1.

As a means of operatively supporting my improvements, I provide a pair of clamping plates 8, to embrace the part 6, connected at one end by the bolt and nut structures 9 and 10, respectively, and at the other end by the bolt and wing-nut structures 11 and 12, respectively. Engaged on the bolt 11, between the clamps 8, is the reduced end 13 of an angular bracket 14, which is cast with a drum shaped casing consisting of a circular plate 15 having a rim flange 16, the edge of the rim flange being cast with enlarged internal lugs 17, tapped as at 18 to receive the screws 19 of a circular closure plate 20. The plate 15 is preferably cast with a central outwardly projecting hub 21, bored to provide a bearing for a rotatable shaft 22, on the outer end of which is tightly secured a drive wheel 23, designed to have frictional engagement with the tread of the pneumatic tire 7. The drive wheel 23 is carried between a collar 24 and washer 25, the latter being held in position by a nut 26 threaded on the end of the shaft. The shaft 22 also has bearing in a bar 27 (Figs. 1 and 3) which spans the interior diameter of the casing and which has its opposite ends bent over and which may be secured in any suitable manner to the flange 16. Said bar 27 has a central extension 28 on one edge, to which is secured by screws 29 an angle bracket 30, in which the end of the shaft 22 rotates.

Attached rigidly to the shaft 22, adjacent the side plate 15, is a permanent magnet 31, formed with branches 32, between which are a series of coil-wound armatures 33, attached to a sleeve or guard 34, surrounding the shaft 22, and supported by a ring 35, which is secured by screws 36 to the plate 27. One end 37 of the winding connects with a binding post 38, and the other end with an armature 33. The binding post 38 is arranged in a block of insulation 39, secured in the side plate 20. To the post 38 is attached a switch 40 having a contact 41, designed to engage a binding post 42, held in an insulation plate 43, also set in the cover plate 20. The switch 40 is manipulated by a handle 44. From the post 42, a conducting wire 45 leads to a binding post 46, made fast in a plate of insulating material 47, secured to the flange 16. With the binding post 46 is connected a spring conductor 48, formed to engage the terminal 49 of an incandescent lamp 50, an opening 51 being provided in the flange 16 to permit the inward projection of the lamp terminal for this purpose.

The incandescent lamp 50 is carried in a socket 52, formed centrally of a reflector 53 which is set in a hood 54, flanged to encompass the opening 51 and to be secured to the flange 16. The outer end of the hood as well as the reflector is closed by a lens 55. In the present embodiment, the electric return is effected through the lamp base, reflector, hood and casing. From this construction, it will be obvious that when the ground wheel is rotated, the magnet 31 will be spun around the armatures setting up a current and causing the lamp to glow.

When it is not desired to light the lamp, the circuit is broken by disengaging the switch 40 from the binding post 42.

Cut in the plate 20, eccentrically with respect to the shaft 22, is an opening 58, which is closed by a vibratory membrane 59 that is secured together with the horn 60 to the plate 20 by means of the bolt and nut structures 61 and 62, respectively. Attached to the membrane 59, centrally thereof, is a conical stud 63, designed to be engaged by teeth formed on the adjacent side of the wheel 64, which is slidably mounted on and driven by the shaft 22 and normally held out of engagement with the stud 63 by a spring 65, interposed for the purpose between the angular bracket 30 and said wheel. The spring 65 also normally holds the wheel 64 against the forked end 66 of a bell-crank-lever 67, pivoted at 68 between the lugs 69, cast on the flange 16. This whole arrangement is such that when the shaft 22 is rotated and the bell-crank-lever 67 is tilted on its pivot to move the wheel 64 towards the horn, the teeth of said wheel will successively impinge the stud 63 causing the membrane to vibrate and consequently sounding the horn.

The bell-crank-lever has a flattened end 70, in contact with a cap 71 secured on the end of a twisted wire strand 72, which extends outwardly through an opening 73 and into a housing 74 (Fig. 4), where it is secured to the disk-shaped base 75 of a push-button 76. Coiled around the wire 72 within the housing 74 is a compression spring 77, which normally urges the button into outward position, but which yields under pressure exerted on the button to cause the cap 71 to impinge the bell-crank-lever.

The wire 72 is incased by a flexible tube 78 having engagement, at its outer end, upon the reduced portion 79 of the housing 74 (Fig. 4), and at its inner end, upon a tubular fitting 80, which is secured to the casing flange 16 in position to form a closure for the opening 73 thereof (Fig. 1).

Figure 4:
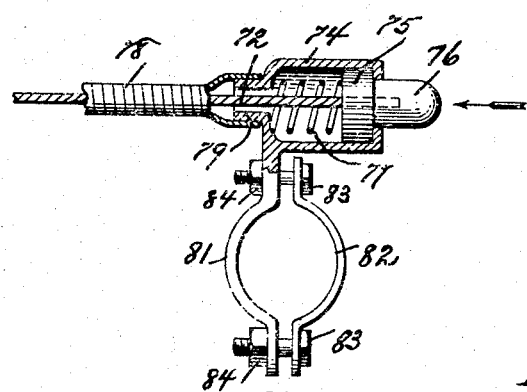
Figure 4 is a detail view, partly in section, showing the housing for the push-button and means for supporting the same.

As clearly shown in Fig. 4, the housing 74 is cast with a clamping member 81, with which co-operates another clamping member 82 as a means of securing the housing on the handle-bar (not shown) of the bicycle. The two clamping members 81 and 82 are drawn together and tightened on the handle-bar by means of the bolts and nuts 83 and 84, respectively.

Through the engagement of the drive wheel 23 with the wheel tire 7, the shaft 22 is driven to actuate the magneto, and to light the lamp whenever the switch is closed. Moreover, as the wheel 64 rotates with the shaft 22, the horn may be caused to sound at will by pressing the push-button 76. Another important feature of the invention resides in the simplicity of the casing structure and in the manner of arranging the parts therein, it being observed that the circular plate 20 may be readily removed and applied without disturbing the interior parts.

I have shown the preferred embodiment of my present invention, but I do not wish to be limited to the exact details of construction shown and described, as obvious modifications thereof, not involving the exercise of invention, may be made by any skilled mechanic, and such departures from what is herein set forth, I consider within the scope and terms of my claims.

Having thus described my invention, what I claim is:—

1. A combined lamp and audible signal comprising in combination with the frame and front wheel of a bicycle, of a cylindrical casing rigidly secured to said frame, an electric lamp on the periphery of said frame, a horn eccentrically mounted on the face of said casing, a shaft journalled axially in said casing to extend outward opposite the horn, a drive wheel fixed on said shaft in constantly operative frictional engagement with said front wheel, a magneto in said casing actuated by said shaft, switch controlled connections between said magneto and said lamp, means on the inner end of said shaft coacting with said horn to produce sound, said means being normally inoperative, and a push button for moving said means into operative engagement with said horn.

2. A combined lamp and audible signal comprising in combination with the frame and front wheel of a bicycle, of a cylindrical casing rigidly secured to said frame, an electric lamp on the periphery of said frame, a horn eccentrically mounted on the face of said casing, said horn having a membrane carrying a central projection, a shaft journalled axially in said casing to extend outward opposite the horn, a drive wheel fixed on said shaft in constantly operative frictional engagement with said front wheel, a magneto in said casing actuated by said shaft, switch controlled connections between said magneto and said lamp, a disc on the inner end of said shaft, said disc being slidably mounted and positively driven by the shaft and having teeth on its side adjacent the projection on said membrane, a spring exerting force to normally maintain said disc out of contact with said projection, a bell-crank lever in said casing opposed to said spring, and a push button associated with said casing to operate the bell-crank lever.

3. A combined lamp and audible signal comprising in combination with the frame and front wheel of a bicycle or like vehicle, of a cylindrical casing rigidly secured to said frame, an electric lamp on the periphery of said frame, a horn eccentrically mounted on the face of said casing, a shaft journalled axially in said casing to extend outward opposite the horn, a drive wheel fixed on said shaft in constantly operative frictional engagement with said front wheel, means actuated by said shaft for producing an electric current in said lamp, other means actuated by said shaft for producing sound from said horn, both of said means being located within the said casing, a push button mounted on the bicycle at a point remote from said casing, and a flexible wire operatively connecting said push button with the sound control means.

This specification signed and witnessed this 15th day of June, 1920.

FRED EVANS.

Witnesses:
EDWARD A. GITT,
F. NOLL.